2 Sheets.
Sheet 1.

H. C. Rodgers.
R.R. Station Indicator.

3841.

Reissued Feb. 15. 1870.

Witnesses:

Wm. A. Morgan
P. C. Dieterich

Inventor:

A. C. Rodgers
per Munn & Co
Attorneys.

2. Sheets.
Sheet 2.

A. C. Rodgers.
R. R. Station Indicator.

No 3841. Reissued Feb. 15. 1870.

Witnesses:
Wm T Morgan
P. C. Dieterich

Inventor:
A. C. Rogers
per Munn & Co
attorneys

United States Patent Office.

AMOS C. RODGERS AND LEWIS SHAFFER, OF FORT WASHINGTON, PENNSYLVANIA, ASSIGNEES OF A. C. RODGERS.

*Letters Patent No.* 95,046, *dated September* 21, 1869; *reissue No.* 3,841, *dated February* 15, 1870.

IMPROVEMENT IN RAILROAD-STATION INDICATORS.

The Schedule referred to in these Letters Patent and making part of the same.

*To all whom it may concern:*

Be it known that A. C. RODGERS, of Fort Washington, in the county of Montgomery, and State of Pennsylvania, did invent an Improvement in Railroad-Station Indicators; and we, AMOS C. RODGERS and LEWIS SHAFFER, of Fort Washington, Montgomery county, Pennsylvania, and sole assignees of the said AMOS C. RODGERS, do hereby declare that the following is a full, clear, and exact description of the said invention.

*Nature and Object of the Invention.*

This invention relates to a new apparatus for displaying within railroad-cars the name of the station which the car is approaching, or at which it has arrived; and The invention consists principally of a system of levers and toothed wheels, by which intermittent rotary motion in either direction can be imparted to a drum, around which a belt or chain containing the names of the stations is placed.

The apparatus, which is applicable to either horse or steam-cars, is arranged to be set in motion by a stop placed on or adjacent to the track, and a bell is so connected to the apparatus that it shall be struck, and thus attract the attention of the passengers, whenever a new name is displayed.

*Description of the Accompanying Drawing.*

Figures 1, 3:
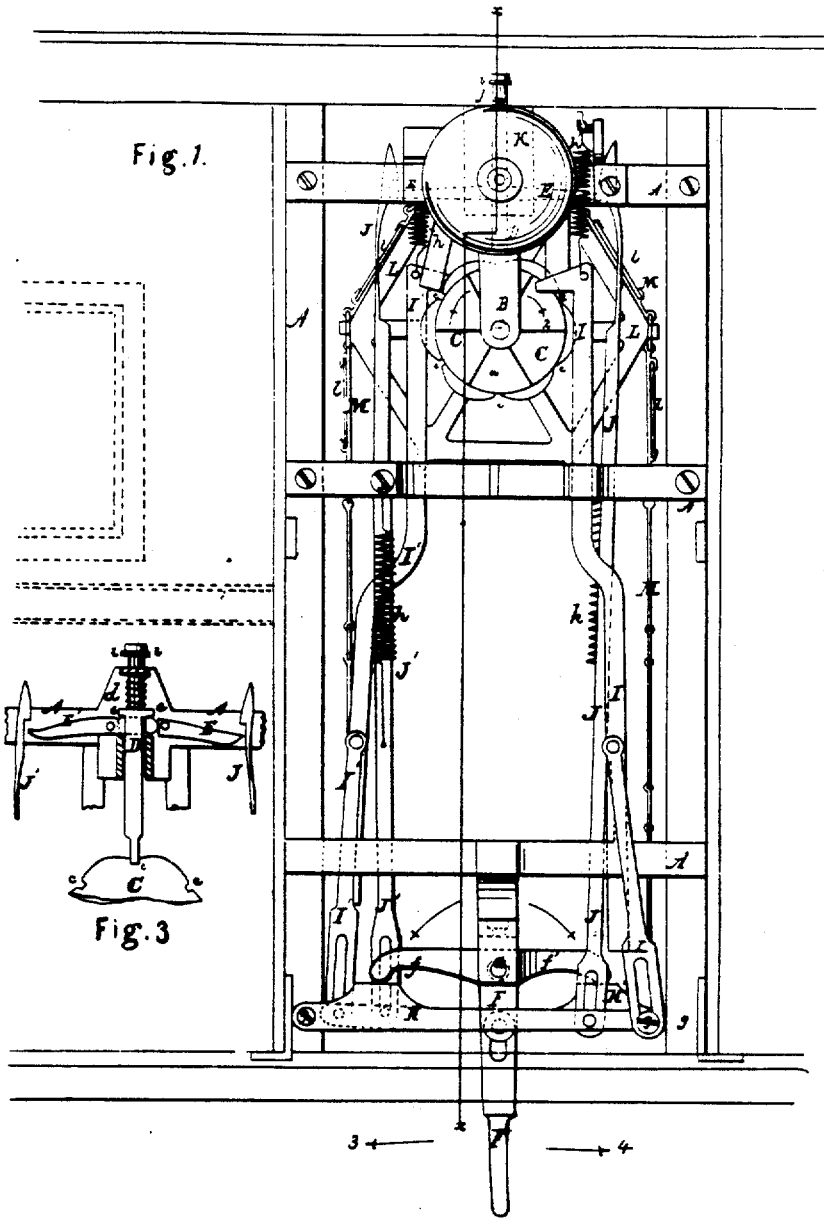

Figure 1, sheet 1, is a front elevation of the improved railroad-station indicator.

Figure 2:
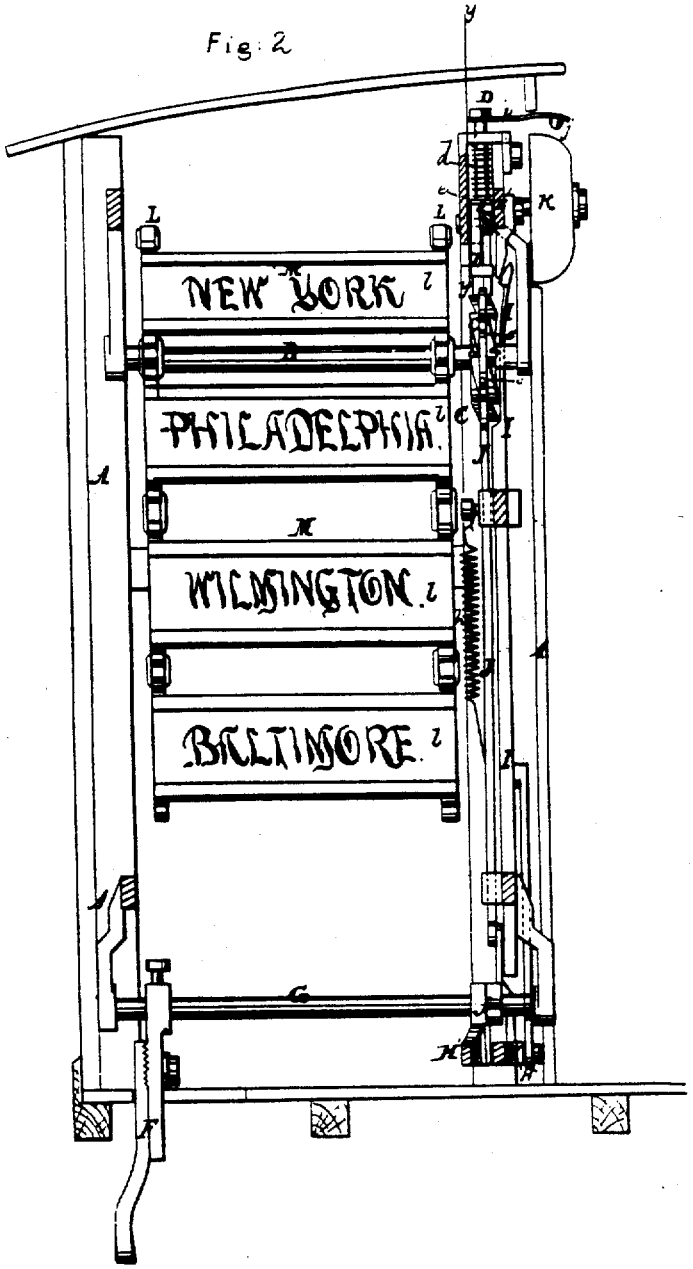

Figure 2, sheet 2, a vertical section of the same on the line *x x*, fig. 1.

Figure 3, sheet 1, a detached sectional view of part of the apparatus on the line *y y*, fig. 2.

*General Description.*

The frame A of the indicator may be constructed of wood or other suitable material, and is arranged in the corner or in any other convenient part of a railroad-car, and is intended to extend from the floor to the roof of the said car.

In the upper part of the frame are formed bearings for a horizontal shaft, B, which has near one end a wheel, C, notched on its periphery, and having on its opposite faces ratchet-teeth, *a* and *b*, inclined in opposite directions, as best observed in fig. 2.

The notches *c* on the edge of the wheel are equal in number to the teeth *a* or *b*, and are arranged to receive the lower end of a sliding rod, D, which is so acted on by a spring, *d*, that, until otherwise operated, it will remain in one of the said notches, and thus prevent the wheel C from turning.

E and E′ are two levers, so pivoted to the frame A that their inner ends shall fit under a shoulder, *e*, of the sliding-rod D, as shown in fig. 3.

The lever F, by which the apparatus is operated, is suspended from a rock-shaft, G, which has its bearings in the lower portion of the frame A, and from which two arms *f* and *f′* project in opposite directions, as shown in fig. 1.

To the frame, directly beneath these arms *f* and *f′* of the shaft G, are pivoted two levers, H and H′.

When the said shaft is swung in the direction of the arrow 1, its arm *f* will bear against the lever H, and will cause the same to turn upon its pivot *g*.

To the outer end of the lever H are hung two vertical rods, I and J, the former of which is hooked at its upper end, so as to form a pawl adapted to the ratchet-teeth *a* of the wheel C. The bar J has also a hooked upper end, which projects over the end of the lever E. As soon, therefore, as the lever H is swung downward, as aforesaid, the hooked rod J will catch and depress the end of the lever E, and will thereby cause the rod D to be raised out of the notch *c*, when the pawl I will catch a tooth *a*, and turn the wheel C and its axle B in the direction of the arrow 2. As soon as the suspended lever F strikes the stop which is arranged upon or adjacent to the railroad-track, (the car moving in the direction of the arrow 3,) the said lever will be swung in the direction of the arrow, and will impart motion to the wheel C, as aforesaid. The lever H′ is, in a similar manner, connected with a vertical rod or pawl, I′, and catch, J′.

The pawl I′ meshes into the teeth *b* of the wheel *c*, while the catch J′ engages with the lever E′, so that, when the lever F is swung in the direction of the arrow 2 during the motion of the car in the direction of the arrow 4, the lever H′ will be swung so as to release the rod D, and turn the wheel in the direction of the arrow 1.

Inclined guides *t t* are so arranged upon the frame A as to laterally withdraw the pawls I and I′, when elevated, from between the teeth of the ratchet-wheel, this preventing either of the said pawls from interfering with the free operation of the other.

The pawls I and I′ should be jointed at *s*, as shown, while the bars J and J′ should be reduced in thickness near the top, so that their hooked upper ends may serve as spring-catches for the levers E and E′.

Both the pawls I I′ and catches J J′ are drawn upward after each movement by springs *h h*.

The operating-lever F is made longitudinally adjustable, as best observed in fig. 2, so that it may be adapted to stops of different heights.

An arm, *i*, to which is affixed a hammer, *j*, projects from the sliding-rod D, said hammer being arranged to strike a bell, K, whenever the rod D is forced downward into a notch, *c*, by the spring *d* after it has been elevated by the action of one of the spring-catches J or J′

On the shaft B is mounted a drum or polygonal disks, L, over which a chain or belt, M, is placed, as shown in the drawing.

This chain or belt contains the names of the several stations along the line of the road, and displays one of these names through an aperture in a casing which surrounds the frame A.

Whenever the lever F strikes a stop on the ground, it causes the shaft B to be so turned as to display another name through the aperture, and, at the same time, the bell is struck by the hammer, to call attention to the change.

The names on the belt or chain should be removable, for which purpose I prefer to print, paint, or otherwise affix the names on plates, *l l*, which are slipped into grooves provided in the chain, as is clearly shown in the drawing.

*Claims.*

1. The combination of a notched wheel, devices for rotating the same, operated by a lever, F, and a sliding-bar, D, operated by said devices so as to be elevated before the movement of the wheel, substantially as described.

2. The combination of the wheel C, having ratchets inclined in opposite directions on its opposite faces or sides, and pawls I I′, arranged at opposite edges of the wheel, and operating substantially as described.

3. The combination of the wheel C, its ratchet-teeth and notches, the pawls I I′, lever F, catches J J′, levers E E′, and lock-rod D, all arranged and operating substantially as described.

4. The combination of the vibrating arms *f f′*, lever F, or its equivalent, levers H H′, and the pawls and catches I I′, J J′, or their equivalents.

5. The arrangement in respect to the pawls I I′ and ratchet-wheel C of the inclined guides *t t*, for the purpose described.

In testimony whereof, we have signed our names to this specification in the presence of two subscribing witnesses.

AMOS C. RODGERS.
LEWIS SHAFFER.

Witnesses:
JOHN WHITE,
LOUIS BOSWELL.